May 6, 1930.                G. C. STANLEY                1,757,267
                           GAS OIL SEPARATOR
                          Filed Dec. 23, 1926
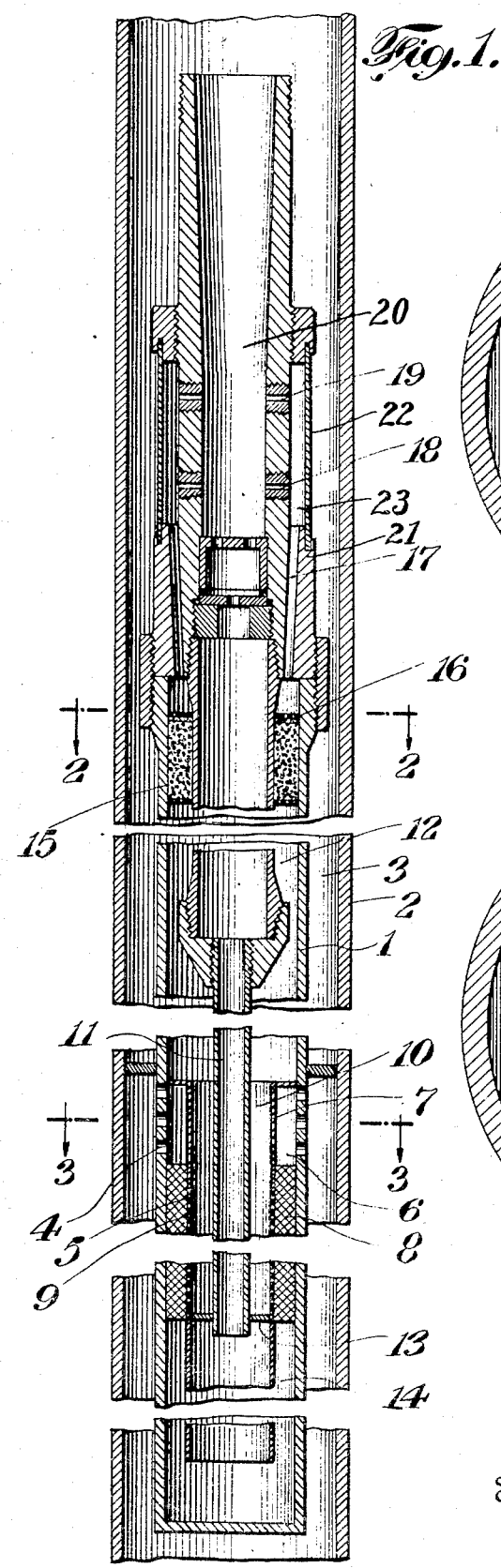
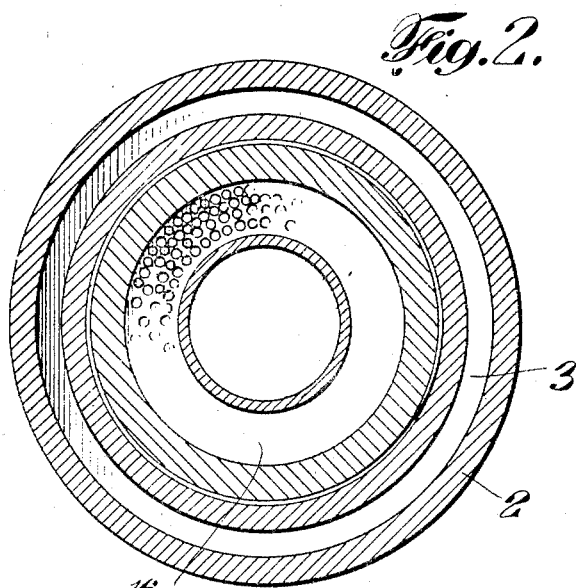
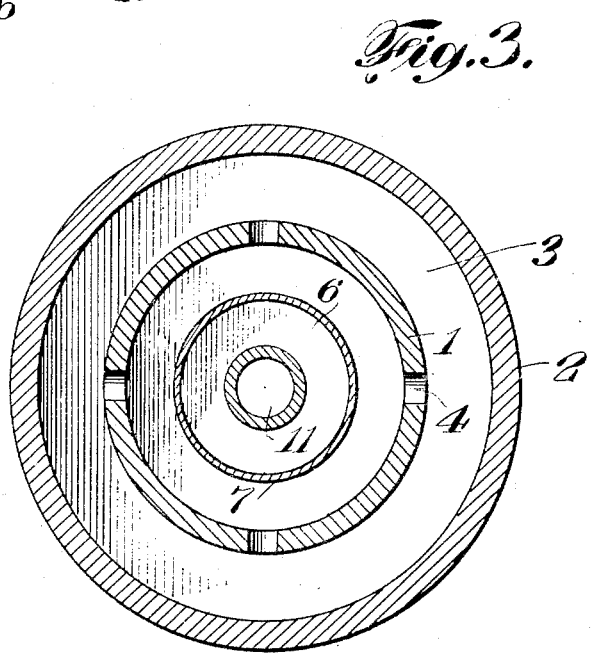
Inventor
George C. Stanley
By his Attorney Ramsay Hoguet Patented May 6, 1930

1,757,267

UNITED STATES PATENT OFFICE

GEORGE C. STANLEY, OF NEW YORK, N. Y., ASSIGNOR TO THE M. W. KELLOGG COMPANY, A CORPORATION OF DELAWARE

GAS-OIL SEPARATOR

Application filed December 23, 1926. Serial No. 156,637.

This invention relates to a gas-liquid separator and more particularly to a device of such a character designed for use in connection with a liquid flowing device.

While my invention has a variety of applications and may be used with a number of different types of apparatus, it is particularly adapted for use in an oil well in which the natural gas of the well alone or together with artificially supplied gas is utilized in raising the oil. It has been found that it is desirable to separate the gas from the oil as effectually as possible, and subsequently to separately introduce the oil and gas into the tubing.

My device has a wide variety of applications and may be used to advantage in connection with any pump where it will serve to separate the gas from the oil, allowing the gas to be separately withdrawn if desired and will render the pumping more efficient. For the purpose of illustration, however, I will describe my invention in connection with its use in an oil well and particularly in connection with a flowing device of a type designed to create a flow either of an air lift character or a flow by alternate pistons of gas and oil.

In flowing devices of this character, and, in fact, in all oil pumping devices it has been found difficult to prevent the gas in the well from blowing through the inlet holes provided in the tubing for the admission of the oil. When this occurs the gas surges up through the tubing or eduction pipe, exhausting the gas pressure and in many instances terminating the flow. Even if the flow is not terminated, the escape of free gas into the eduction tubing creates an uneven flow.

It is the aim of this invention to provide a method and apparatus for effecting a substantial separation of free gas from the oil and preventing the escape of the gas into the tubing in unregulated amounts.

In carrying out my invention I provide a tubing closed at its lower end and surrounded by a casing which provides an annular space between the tubing and the casing. This annular space is open at its lower end to admit gas and oil from the oil sands, but may if desired be closed at a point above the gas and oil inlets provided in the wall of the tubing. Preferably at a point below the level to which the well will deliver liquid constantly the tubing is provided with one or more openings, permitting the inflow of gas and oil, much of the gas being carried with the oil as free gas, into a separating chamber which is preferably but not necessarily, located within the tubing. The separating chamber is provided with suitable means for diverting the path of the oil over an enlarged contact surface, thus serving to separate the free gas from the oil. The separator chamber is surrounded by, or is in contact with, one or more other chambers which I have termed "escape chambers" and the dividing wall or walls are perforated to permit the escape of the gas. The escape chambers connect with a passageway leading to a gas reservoir, the upper end of which discharges into a gas inlet, which may comprise one or several apertures, provided in the wall of the tubing, preferably below the level of the liquid therein. It will thus be understood that the gas will rise from the escape chambers not only due to its buoyancy but also due to the difference in pressure created by the flow of gas from the annular space into the interior of the tubing.

The oil in the separating chamber will flow downwardly through the separating means provided, giving up its entrained gas and finally discharging into the tubing or eduction pipe.

It will be readily seen that this apparatus provides an effective means for separating the oil and gas. The oil after seeping through the bottom of the separating chambers will rise to a level in the tubing dependent upon the depth and pressure of the well. The gas which has been separated into the gas reservoir provided therefor may, if desired, be introduced into the tubing in regulated volume and under a relative predetermined pressure controlled by existing conditions.

Referring now to the drawings:

Figure 1 is a longitudinal sectional view of a flowing device in an oil well. Figure 2 is a cross section thereof on the line 2—2 and Figure 3 is a cross section on the line 3—3 through the gas and oil inlets. Numeral 1 is used to designate a tubing closed at its lower end having therearound a casing 2 thereby forming between the casing and tubing an annular space 3. This annular space is open at the bottom to admit gas and oil from the oil sands but may be closed if desired at a point above the gas-oil inlets which are provided in the wall of the tubing 1. The gas-oil inlets 4 are preferably positioned at a point slightly below the level to which the well will constantly deliver a flow of gas and oil and open into a separating chamber 5 which preferably but not necessarily, may take the form of an annular space 6 between the tubing 1 and tubing 7 contained therein. The separating chamber 5 is provided with a means 8 for agitating the fluid and for diffusing it over a large contact surface. This means may take the form of wire packed into the annular space, raschig rings, or any other suitable material. The interior wall 7 of the separating chamber has the perforations 9 to allow the escape of the gas into escape chamber 10 which preferably is also an annular space formed between the wall 7 and tubing 11 positioned therein. This escape chamber is open at the top allowing the gas to escape upwardly into a gas reservoir 12 provided therefor.

The chamber 10 is, however, separated from the end of the eduction tubing 11 by a partition 13 and any oil escaping from the separator chamber 5 with the gas will collect above the partition 13. Such collection of oil may reach a considerable height for the time being, but as pressure is developed above this oil, the oil will be forced backwardly through the lowermost perforations 9 to the separator chamber; in other words, the provision of the partition 13 forms a trap for the return of fluid to its proper place. The bottom of the separator chamber 5 opens into an oil storage reservoir formed by the closed bottom portion of the tubing 1. If desired, escape chamber 10 may be joined directly with the space 14 to permit the return of oil passing to the escape chamber with the gas. The tubing or wall 7 is extended well below the bottom of the separator chamber, forming an elongated passageway 14 through which the oil must pass before it can reach the eduction tubing 11.

Since the oil is introduced at a point above the separating chamber, the oil would ordinarily stand therein about as high as the bottom of the separator chamber thereby providing a liquid seal over the bottom of this chamber through which any gas from the escape chamber or from the separator chamber must pass before it can reach the eduction tubing. Since the gas may freely escape upwardly through the escape chamber, this liquid seal, which may if desired be many feet in length, is an effective means for preventing the passage of gas into the eduction tubing.

The gas escaping from the chamber into the escape chamber passes upwardly into the gas reservoir 12 at the top of which another separator 15 may be provided comprising raschig rings or any material suitable for separating any liquid entrained with the gas. The separator is preferably provided with a screen 16 at its upper end. The separator itself may be encased at top and bottom by perforated metal plates which serve to encase the separating material used. After passing through the separator 15 the gas is lead through a passage 17 which communicates with the interior of the upper portion 20 of the eduction tubing by means of the inlets 18 which are preferably positioned at a point below the level of the liquid in the eduction tubing.

Shoulders 21 are provided on the exterior of the upper portion of the eduction tube 20 on either side of the gas inlets and a metal shield is provided therearound forming a shielded space around the inlets and cooperating with the screen 16 to prevent the entrance of any solid matter which might clog the inlets 19. It will be readily apparent that the inlets 19 admitting gas to the interior of the casing create a suction in the passageway 17 thereby providing a force supplementing the buoyancy of the gas in lifting it upwardly from the escape chamber 10.

While I have disclosed one embodiment of my invention in detail, it will be understood that many modifications may be made without departing from the spirit of my invention which is to be limited only by the following claims.

I claim:

1. The method of separating oil from gas in an oil well which comprises flowing the gas-oil mixture in a vertical stream, baffling the flow of the mixture and contacting it with an enlarged surface, discharging the gas rising from the mixture, permitting the oil to settle and collect in a body, withdrawing the oil from said body, and maintaining a liquid seal between the point of gas discharge and the point of oil withdrawal.

2. The method of separating oil from gas in an oil well which comprises flowing the gas-oil mixture in a descending vertical stream, baffling the flow of the mixture and contacting it with an enlarged surface, discharging the gas rising from the mixture, permitting the oil to settle and collect in a body, and withdrawing the oil from a portion of said body out of direct contact with the decending freshly-separated oil.

3. The method of raising liquid in liquid and gas wells which comprises flowing the gas-liquid mixture in a vertical stream, baffling the flow of the mixture and contacting it with an enlarged surface, separating the gas rising from the mixture, permitting the liquid to settle and collect in a body, withdrawing the liquid from said body, maintaining a liquid seal between the point of gas separation and the point of liquid withdrawal, and introducing said separated gas into the liquid withdrawn from said body at a point above the point of gas separation to assist in raising the liquid.

4. The method of raising liquid in liquid and gas wells which comprises flowing the gas-liquid mixture in a descending vertical stream, baffling the flow of the mixture and contacting it with an enlarged surface, separating the gas rising from the mixture, permitting the liquid to settle and collect in a body, withdrawing liquid in an ascending column from a portion of said body out of direct contact with the descending freshly-separated liquid, and introducing said separated gas into said ascending column of liquid at a point above the point of gas separation to assist in raising the liquid.

5. The method of raising oil in oil and gas wells under pressure which comprises flowing the gas-oil mixture in a descending vertical annular stream, baffling the flow of the mixture and contacting it with an enlarged surface, separating the gas rising from the mixture, permitting the oil to settle and collect in a body, withdrawing oil from a portion of said body out of direct contact with the descending freshly-separated oil in an ascending vertical column within said annular stream, and introducing said separated gas under predetermined conditions controlled by the relative pressure in the well into said ascending column of oil at a point above the point of gas separation to assist in raising the oil.

6. An apparatus for raising oil in a well comprising a tubing, said tubing having a plurality of gas-oil inlets in its wall, two concentric tubes within said tubing, thus forming two annular chambers surrounding a central eduction passage, one of said chambers comprising a separator chamber with which said inlets communicate, said separator chamber having therein a material for increasing the surface area over which the gas-oil mixture passes, said chamber having perforations in its wall communicating with the second annular chamber and having an outlet for oil, said oil outlet being closed to the passage of gas by means of a liquid seal.

7. An apparatus for separating gas and oil in a well comprising in combination a tubing, a separator chamber, gas-oil inlets communicating with said separator chamber, means within said separator chamber for diffusing the stream over a large surface, means for separately withdrawing gas from said chamber, and an oil outlet from said chamber provided with a liquid seal and communicating with said tubing.

8. A flowing device comprising a tubing, a casing surrounding the tubing and forming therebetween an annular space open at its bottom to admit liquid and gas but closed below the top, said tubing having liquid-and-gas inlets communicating with the said annular space for leading gas and oil therefrom into a separating chamber having therein a granular substance, said chamber having a number of perforations in its wall for the escape of gas, communicating with a passageway for leading said escaped gas into a gas reservoir, said chamber having an oil outlet at its bottom and a liquid seal over said oil outlet at its bottom, said tubing being closed at a point below the oil outlet of said separator chamber, and an eduction tube communicating with the closed end of said tubing and having inlets located above said gas reservoir for introducing gas under pressure into the eduction tube below the liquid level therein.

9. In a flowing device, a tubing having a standing column of oil therein, a casing therearound forming an annular space therebetween, said space being open at its bottom to permit the entrance of oil and gas from the oil sands but closed at its top, said tubing having a number of openings in its wall admitting oil and gas from said annular space into a separating chamber, said chamber having means therein for agitating oil and gas, and having an oil outlet communicating with the interior of an eduction tube, a liquid seal over said outlet for hindering the passage of gas therethrough, said separating chamber having a number of gas outlets communicating with a passageway, a porous packing in said passageway, and a gas inlet in the wall of said eduction tube above said passageway for introducing gas into the interior of the eduction tube below the top of the liquid column therein.

10. A gas and oil separator comprising an elongated separator chamber having therein a granular material, the wall of said chamber being perforated allowing gas to escape into another chamber open at its top to allow the escape of gas upwardly, and closed at its bottom, said separator chamber opening at its bottom into an oil reservoir forming a liquid seal over the bottom of said separator chamber and preventing the passage of the gas therethrough.

11. An apparatus for raising oil in a well under pressure, comprising a tubing closed at its bottom, a casing therearound forming an annular space therebetween which is open at its bottom, a separator chamber, means for passing gas and oil into said separator chamber from said annular space, means for permitting free gas to escape from said chamber to a gas reservoir and for withdrawing free oil from said chamber to an eduction tubing, and means for introducing gas under pressure from said gas reservoir into said eduction tubing.

12. A flow device comprising a tubing, a casing surrounding said tubing and forming therebetween an annular space closed at its top but open at its bottom to permit the entrance of gas and oil, an opening in the wall of said tubing leading the gas and oil into a separating chamber, means within the separating chamber for diffusing the oil stream, and permitting the escape of free gas, there being perforations in the wall of said separator chamber which serve as gas outlets, means for collecting and returning to the separator chamber any oil escaping from the gas outlets, an oil eduction tube and an oil reservoir communicating between said separator chamber and said eduction tube, said reservoir serving as a liquid seal to prevent the passage of gas to said eduction tube and means for collecting the free gas above the separator and for introducing it under predetermined conditions into said eduction tube.

13. A gas-oil separator comprising an elongated separator chamber having therein a baffle for causing the gas-oil stream to flow over an increased contact surface, outlets in said contact surface for the escape of gas from said separator chamber, means for returning to said separator chamber any oil escaping with the gas, and a liquid seal over the lower end of the chamber to prevent the passage of gas therefrom.

In testimony whereof, I have signed my name to this specification this 16th day of December, 1926.

GEORGE C. STANLEY.